United States Patent
Blanchard et al.

(10) Patent No.: US 8,870,531 B2
(45) Date of Patent: Oct. 28, 2014

(54) TURBOMACHINE ROTOR HAVING BLADES OF COMPOSITE MATERIAL PROVIDED WITH METAL LABYRINTH TEETH

(75) Inventors: Stephane Pierre Guillaume Blanchard, Chartrettes (FR); Julien Mateo, Carignan de Bordeaux (FR); Stephane Otin, Paris (FR)

(73) Assignee: SNECMA, Paris (FR)

( * ) Notice: Subject to any disclaimer, the term of this patent is extended or adjusted under 35 U.S.C. 154(b) by 1356 days.

(21) Appl. No.: 12/636,041

(22) Filed: Dec. 11, 2009

(65) Prior Publication Data

US 2010/0158675 A1    Jun. 24, 2010

(30) Foreign Application Priority Data

Dec. 23, 2008  (FR) ...................... 08 59000

(51) Int. Cl.
F01D 5/22 (2006.01)
F01D 11/18 (2006.01)
F04D 29/32 (2006.01)
F01D 5/28 (2006.01)
F04D 29/02 (2006.01)
F01D 5/30 (2006.01)

(52) U.S. Cl.
CPC .......... *F01D 5/282* (2013.01); *F05D 2300/603* (2013.01); *F04D 29/324* (2013.01); *Y02T 50/672* (2013.01); *F04D 29/023* (2013.01); *F01D 11/18* (2013.01); *F01D 5/3007* (2013.01); *F01D 5/225* (2013.01)
USPC .......................... 415/173.5; 416/191; 416/192

(58) Field of Classification Search
USPC ..................... 415/170.1, 173.1, 173.4, 173.5; 416/174, 189, 191, 192
See application file for complete search history.

(56) References Cited

U.S. PATENT DOCUMENTS

| | | | | |
|---|---|---|---|---|
| 2,610,823 A | * | 9/1952 | Knowlton, Jr. | 416/190 |
| 3,048,365 A | * | 8/1962 | Foster et al. | 416/190 |
| 3,095,138 A | * | 6/1963 | Warnken | 416/190 |
| 3,556,675 A | | 1/1971 | Howald et al. | |

(Continued)

FOREIGN PATENT DOCUMENTS

| DE | 38 42 710 C1 | 8/1989 |
|---|---|---|
| DE | 195 31 561 A1 | 3/1997 |

(Continued)

OTHER PUBLICATIONS

U.S. Appl. No. 12/636,041, filed Dec. 11, 2009, Blanchard, et al.

(Continued)

*Primary Examiner* — Edward Look
*Assistant Examiner* — Sean J Younger
(74) *Attorney, Agent, or Firm* — Oblon, Spivak, McClelland, Maier & Neustadt, L.L.P.

(57) ABSTRACT

The invention provides a turbine machine rotor having blades of composite material, the rotor comprising an assembly disk, a plurality of composite material blades mounted on the assembly disk via their roots and each provided at its free end with a platform, and a metal shroud positioned on the blade platforms concentrically around the assembly disk and including labyrinth teeth that project radially outwards in order to abrade an abradable material carried by a casing surrounding the rotor, the casing being held stationary both axially and circumferentially relative to the blade platforms and being suitable for moving radially outwards in operation relative to the blade platforms.

6 Claims, 2 Drawing Sheets

(56) References Cited

U.S. PATENT DOCUMENTS

| | | | |
|---|---|---|---|
| 3,680,977 A * | 8/1972 | Rabouyt et al. | 415/173.6 |
| 3,728,044 A * | 4/1973 | Fujita et al. | 416/190 |
| 3,857,650 A * | 12/1974 | Cerrato | 416/218 |
| 3,918,840 A * | 11/1975 | Haworth et al. | 416/190 |
| 4,028,006 A * | 6/1977 | Kuroda et al. | 416/191 |
| 4,832,568 A * | 5/1989 | Roth et al. | 415/189 |
| 5,037,273 A * | 8/1991 | Krueger et al. | 416/190 |
| 5,253,978 A * | 10/1993 | Fraser | 416/190 |
| 6,371,725 B1 * | 4/2002 | Manteiga et al. | 415/209.4 |
| 6,976,824 B2 * | 12/2005 | Nottin | 415/115 |
| 7,393,182 B2 * | 7/2008 | Matheny | 416/181 |
| 7,798,778 B2 * | 9/2010 | Martensson | 416/190 |
| 2007/0086889 A1 | 4/2007 | Matheny | |
| 2007/0147993 A1 * | 6/2007 | Lhoest et al. | 415/191 |

FOREIGN PATENT DOCUMENTS

| | | |
|---|---|---|
| EP | 1 469 165 A1 | 10/2004 |
| GB | 1 299 929 | 12/1972 |
| WO | WO 2006/062451 A1 | 6/2006 |

OTHER PUBLICATIONS

U.S. Appl. No. 12/646,454, filed Dec. 23, 2009, Blanchard, et al.
U.S. Appl. No. 13/141,857, filed Jun. 23, 2011, Blanchard, et al.

* cited by examiner

TURBOMACHINE ROTOR HAVING BLADES OF COMPOSITE MATERIAL PROVIDED WITH METAL LABYRINTH TEETH

BACKGROUND OF THE INVENTION

The present invention relates to the general field of turbomachine blades of composite material comprising fiber reinforcement densified by a matrix.

The intended field is that of rotors having composite material blades for aeroengines or for industrial turbines.

Proposals have already been made to use composite material for making turbomachine blades. By way of example, reference may be made to patent application FR 08 58090 (not yet published) filed in the joint names of Snecma and Snecma Propulsion Solide, describing the fabrication of a turbomachine blade by making a fiber preform by three-dimensional weaving and densifying the preform with a matrix.

For a rotor having metal blades, the rotor generally has a plurality of metal blades mounted via their roots on a metal disk, together with a metal casing placed around the rotor. During assembly (when cold) of the rotor inside the casing, it is necessary to leave radial clearance between the tips of the blades and the casing that surrounds the rotor. However, in operation (when hot), this clearance can give rise to leaks of gas between the tips of the blades and the casing.

In order to reduce the risk of such leaks appearing, the free ends of the blades are generally provided with radial labyrinth teeth, and an abradable material is mounted on the inside surface of the casing facing the labyrinth teeth. In operation of the rotor, the disks, the blades, and the casing surrounding the rotor all expand in such a manner that the labyrinth teeth carried by the blades abrade the abradable material carried by the casing. As a result, the clearance left on assembly between the tips of the blades and the casing tends to disappear, thereby limiting gas leakage.

In contrast, with a rotor having blades made of composite material, the expansion differences between the rotor (made in part out of the composite material of its blades) and the casing (made of metal) can become large. As a result, when operating hot, the radial clearance left during assembly between the labyrinth teeth of the blades and the abradable material of the casing does not disappear completely, thereby having the consequence of sealing between the rotor and the casing no longer being fully ensured.

OBJECT AND SUMMARY OF THE INVENTION

A main object of the present invention is thus to mitigate such drawbacks by proposing a turbomachine rotor having composite material blades in which sealing relative to the surrounding casing can be ensured in operation.

According to the invention, this object is achieved by a rotor comprising an assembly disk, a plurality of composite material blades mounted on the assembly disk via their roots and each provided at its free end with a platform, and a metal shroud positioned on the blade platforms concentrically around the assembly disk and including labyrinth teeth that project radially outwards in order to abrade an abradable material carried by a casing surrounding the rotor, the casing being held stationary both axially and circumferentially relative to the blade platforms and being suitable for moving radially outwards in operation relative to the blade platforms.

The rotor of the invention is mounted while cold inside the casing, with radial clearance being left between the labyrinth teeth of the shroud and the abradable material carried by the casing. In operation, the shroud expands thermally under the effect of the heat given off by the gas passing through the rotor, and under the effect of the centrifugal force exerted by the rotor it moves radially towards the abradable material. As a result, the radial clearance between the labyrinth teeth of the blades and the abradable material carried by the casing can be eliminated in operation. Sealing between the rotor and the surrounding casing is thus properly ensured in operation.

In an advantageous disposition, the rotor further comprises at least one pin passing through the shroud and the platform of at least one blade in a direction that is substantially radial, the pin being fastened to the shroud and being suitable for moving radially relative to the blade platforms so as to prevent the shroud from moving axially and circumferentially relative to the blade platforms while allowing the shroud to move radially relative to the blade platforms.

Preferably, each pin passes through an orifice formed in the platform of a blade at a junction between two adjacent blade platforms. Furthermore, each pin may be welded to the shroud. A plurality of pins may also be regularly distributed around the shroud.

The platform of each blade may present a rim projecting radially outwards, the shroud having a circumferential groove that is inwardly open and in which the rim of each blade platform is received so as to guide the shroud during its radial movement relative to the blade platforms.

The invention also provides a turbomachine having at least one rotor as defined above.

BRIEF DESCRIPTION OF THE DRAWINGS

Other characteristics and advantages of the present invention appear from the following description made with reference to the accompanying drawings that show an embodiment having no limiting character. In the figures.

DETAILED DESCRIPTION OF AN EMBODIMENT

Figure 1:
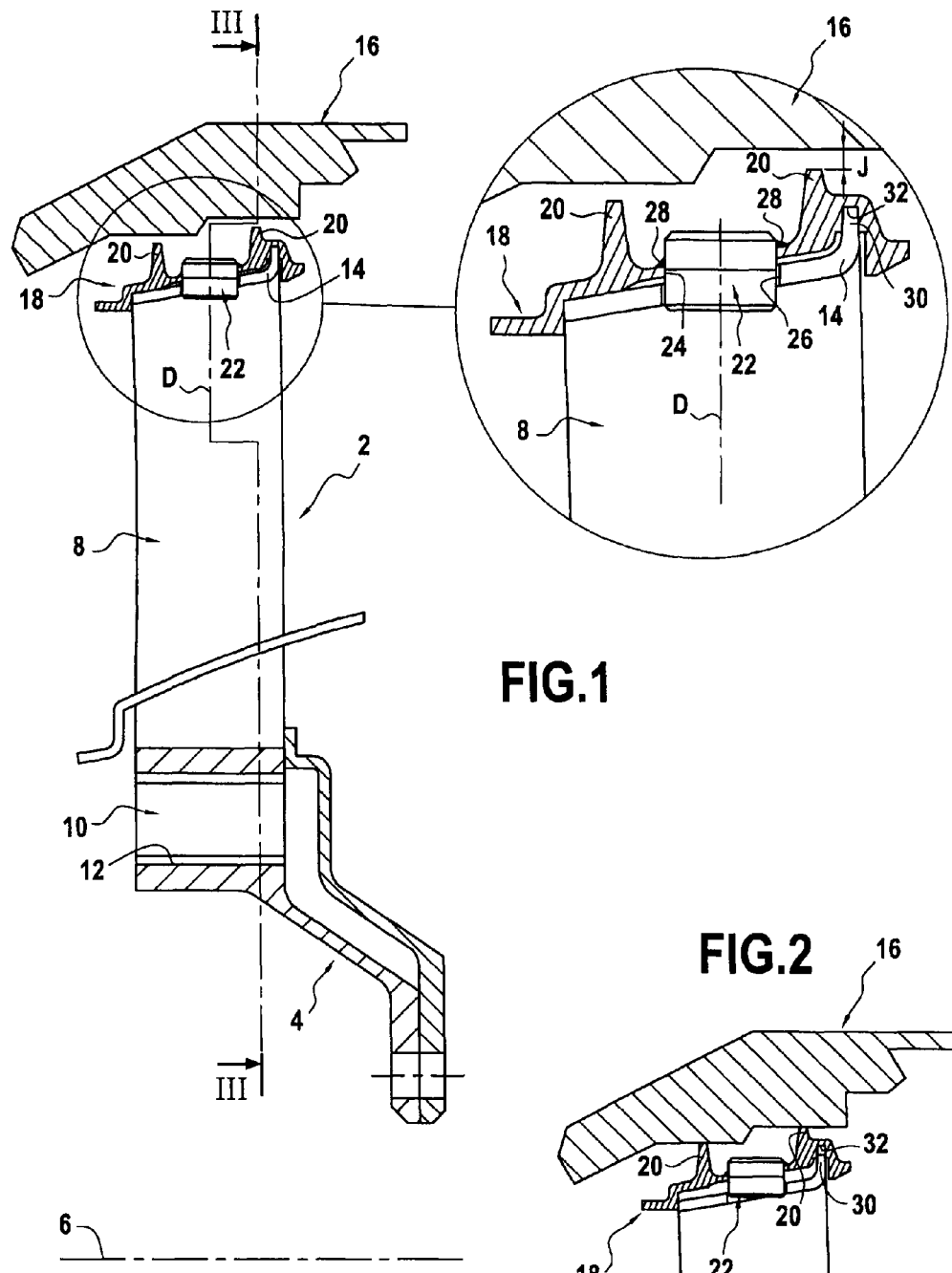
FIG. 1 is a longitudinal section view of a rotor of the invention when cold.
Figure 2:
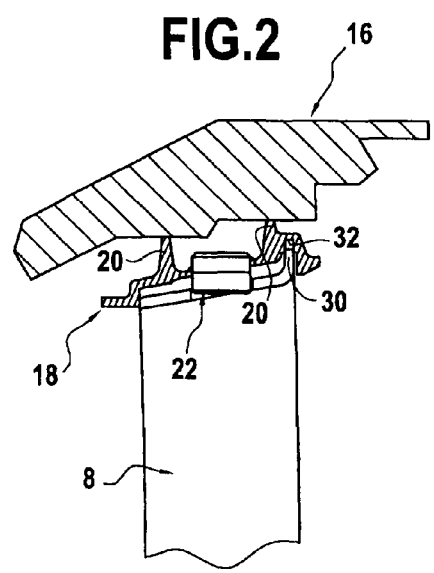
FIG. 2 is a fragmentary view of the FIG. 1 rotor when hot.

The invention is applicable to various types of rotor carrying composite material blades in a turbomachine, and in particular compressor and turbine rotors of various gas turbine spools, e.g. a low pressure turbine rotor of an aviation turbomachine, of the kind shown in FIGS. 1 to 5.

The rotor 2 shown in FIGS. 1 to 5 comprises in particular a metal assembly disk 4 centered on the axis of rotation 6 of the rotor and having blades 8 mounted thereon via their respective roots 10.

In the example of FIGS. 1 to 5, the blades 8 are mounted on the disk 4 in conventional manner by means of slots 12 formed in the outer periphery of the disk and each extending in a direction that is substantially parallel to the axis of rotation 6 of the rotor, the roots 10 of the blades being received in the slots and being held axially by end plates. Naturally, any other type of mounting for the blades 8 on the assembly disk 4 could be envisaged.

Each blade 8 is made of composite material using methods known to the person skilled in the art. Reference may be made for example to patent application FR 08 58090 which describes the fabrication of one such blade comprising fiber reinforcement obtained by three-dimensional weaving of yarns and densifying with a matrix.

Each of the blades 8 is provided at its free end (or tip) with a top platform 14 of composite material, this platform being disposed facing an abradable material 16 mounted on the inside surface of a metal annular casing centered on the axis of rotation 6 and surrounding the rotor (not shown in the figures).

According to the invention, a metal shroud 18 centered on the axis of rotation 6 is positioned on the platform 14 of the blades concentrically about the assembly disk 4. The shroud 18 is made as a single part extending around 360°.

The shroud 18 has metal labyrinth teeth 20 that project radially outwards (i.e. away from the axis of rotation 6) and that are designed, while the turbine is in operation, to abrade the abradable material 16 carried by the casing surrounding the rotor.

Furthermore, the shroud 18 is mounted on the platform 14 of the blades 8 so as to possess a single freedom of movement in radial displacement, i.e. it is held axially and circumferentially relative to the blade platforms while being capable of moving radially outwards (i.e. away from the axis of rotation 6) relative to the blade platforms.

For this purpose, the rotor 2 is provided with at least one pin 22 (or peg) that passes in a substantially radial direction D through an orifice 24 formed in the shroud 18 and an orifice 26 formed in the platform 14 of at least one blade, the orifices 18 and 26 being radially in alignment with each other. The rotor preferably has a plurality of such pins 22 that are regularly spaced apart around the shroud.

Each pin 22 is fastened to the shroud 18 via its outer end, e.g. by beads of welding 28, and its inner end that passes through the orifice 26 formed in the platform 14 of the blade is free. As a result, the pin 22 allows the shroud 18 to be held stationary both axially and circumferentially relative to the platform 14 of the blades while enabling the platform to move radially outwards relative to the blade platforms.

Figure 4:
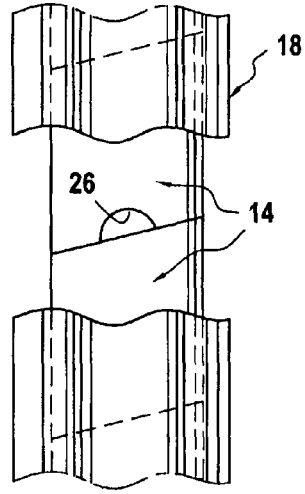
FIG. 4 is a cutaway plan view of the rotor of FIGS. 1 and 2.
Figure 5:
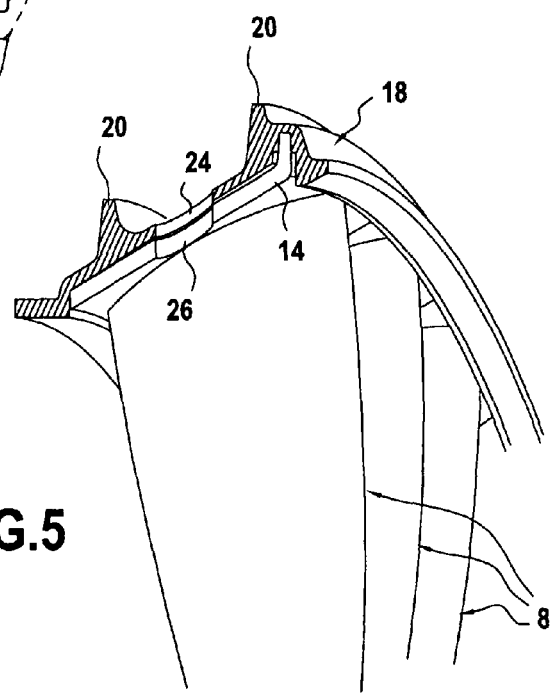
FIG. 5 is a fragmentary perspective view of the rotor of FIGS. 1 and 2.

In an advantageous disposition of the invention shown in particular in FIG. 4, the orifice 26 formed in the blade platforms for passing each pin is located at a junction between the platforms 14 of two adjacent blades.

Under such circumstances, it is preferable for only one of the platforms 14 of the two adjacent blades to present an orifice 26 for passing the pin, said orifice being semicylindrical in shape, for example. The corresponding orifice 24 that is formed in the shroud is substantially cylindrical. With this disposition, each pin 22 is generally L-shaped in radial section perpendicular to the axis of rotation 6 (see FIG. 3).

Figure 3:
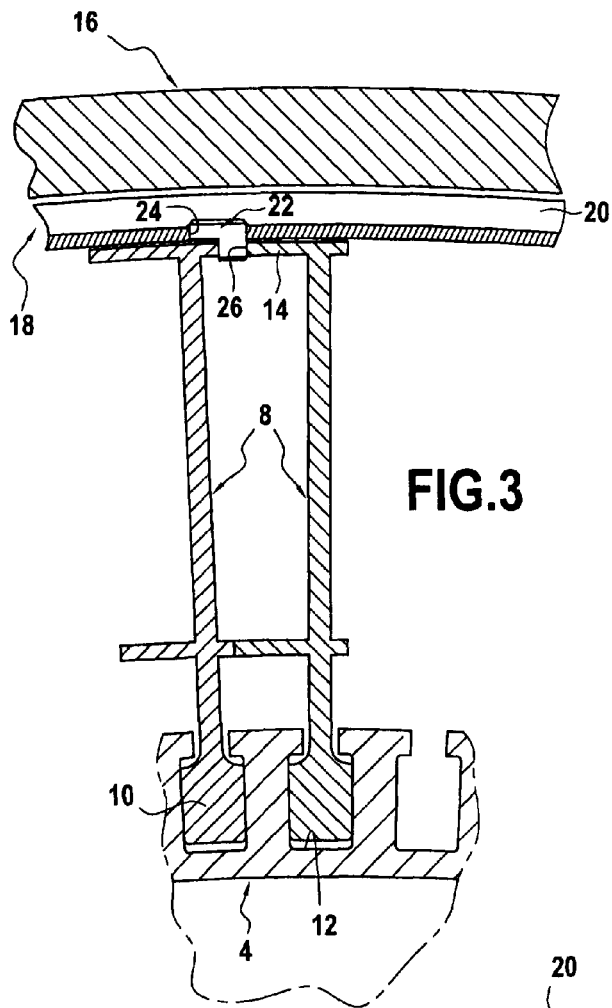
FIG. 3 is a section view of FIG. 1 on III-III.

Naturally, it is equally possible to envisage that two platforms of two adjacent blades are machined with respective semicylindrical orifices so as to form a cylindrical hole, with the pin then being likewise cylindrical in shape. Nevertheless, compared with a cylindrical pin, the particular arrangement shown in FIG. 3 presents the advantage of only one of the two platforms being machined, thereby limiting costs and problems associated with machining a composite material.

In another advantageous disposition of the invention, the platform 14 of each blade 8 presents a rim 30, e.g. at its end that is downstream (relative to the flow direction of gas passing through the turbine), the rim 30 projecting radially outwards, and the shroud 18 presenting a circumferential groove 32 that is open towards the inside (i.e. towards the axis of rotation 6). Thus, when the shroud is assembled on the blade platforms, the rim 30 of each platform is received in the groove 32 of the shroud so as to guide the shroud during its radial displacement relative to the blade platforms.

The operation of the rotor 2 of the invention is as follows. When cold (FIGS. 1, 3, and 5) the metal shroud 18 is positioned on the platforms 14 of each of the blades 8 of the rotor and the pins 22 are inserted in the respective orifices 24, 26 of the shroud and of the platforms prior to being welded to the shroud. The blades carrying the metal shroud are then mounted on the assembly disk 4 via their respective roots 10. This cold assembly enables radial clearance J to be left between the labyrinth teeth 20 of the shroud 18 and the abradable material 16.

When hot (FIG. 2), i.e. when the rotor is in operation, the casing carrying the abradable material 16, the assembly disk 4, and the shroud 18, which are all made of metal, expands under the effect of the heat given off by the gas passing through the turbine, such that their respective diameters increase. When the blades 8 are made of composite material, they expand only very little. Furthermore, under the effect of the centrifugal force generated by the rotor rotating, the shroud 18 moves radially towards the abradable material 16 so as to eliminate the radial clearance J between the labyrinth teeth 20 of the shroud 18 and the abradable material 16. Sealing is then well ensured between the rotor and the surrounding casing when the machine is in operation.

What is claimed is:

1. A turbine machine rotor having composite material blades, wherein the rotor comprises:
   an assembly disk;
   a plurality of composite material blades mounted on the assembly disk via their roots and each provided at its free end with a platform;
   a metal shroud positioned on the blade platforms concentrically around the assembly disk and including labyrinth teeth that project radially outwards in order to abrade an abradable material carried by a casing surrounding the rotor, the metal shroud being held stationary both axially and circumferentially relative to the blade platforms and being suitable for moving radially outwards in operation relative to the blade platforms; and
   at least one pin passing through a first orifice provided in the metal shroud and a second orifice provided in the platform of at least one blade in a direction that is substantially radial, the pin being fastened to the metal shroud and being suitable for moving radially relative to the blade platforms so as to prevent the metal shroud from moving axially and circumferentially relative to the blade platforms while allowing the metal shroud to move radially relative to the blade platforms,
   wherein the at least one pin is substantially L-shaped in radial section perpendicular to an axis of rotation of the disk.

2. A rotor according to claim 1, wherein the at least one pin passes through the second orifice at a junction between two adjacent blade platforms.

3. A rotor according to claim 1, wherein the at least one pin is welded to the shroud.

4. A rotor according to claim 1, having a plurality of pins regularly distributed around the shroud.

5. A rotor according to claim 1, wherein the platform of each blade presents a rim projecting radially outwards, the shroud having a circumferential groove that is inwardly open and in which the rim of each blade platform is received so as to guide the shroud during its radial movement relative to the blade platforms.

6. A turbomachine including at least one rotor according to claim 1.

* * * * *